United States Patent
Reial et al.

(10) Patent No.: US 7,197,063 B2
(45) Date of Patent: Mar. 27, 2007

(54) ADVANCED RAKE DELAY CONTROL

(75) Inventors: Andres Reial, Lund (SE); Anders Ericsson, Södra Sandby (SE); Christer Östberg, Staffanstorp (SE); Robert Svensson, Lund (SE); Johan Nilsson, Höllviken (SE); Håkan Eriksson, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 786 days.

(21) Appl. No.: 10/359,857

(22) Filed: Feb. 7, 2003

(65) Prior Publication Data

US 2004/0203405 A1 Oct. 14, 2004

Related U.S. Application Data

(60) Provisional application No. 60/412,152, filed on Sep. 18, 2002.

(51) Int. Cl.
  *H04B 1/00* (2006.01)
(52) U.S. Cl. .......................... 375/142; 375/349
(58) Field of Classification Search ................ 375/130, 375/140, 141, 144, 147–148, 346, 349; 370/335, 370/342, 441
  See application file for complete search history.

(56) References Cited

U.S. PATENT DOCUMENTS

| | | | |
|---|---|---|---|
| 6,650,692 B2 * | 11/2003 | Inoue et al. ................. 375/147 |
| 6,768,729 B1 * | 7/2004 | Ohsuge ....................... 370/342 |
| 7,039,099 B2 * | 5/2006 | Tamura et al. .............. 375/150 |
| 2001/0009562 A1 | 7/2001 | Ohno |
| 2002/0181488 A1 | 12/2002 | Okazaki et al. |
| 2003/0039304 A1 * | 2/2003 | Terao ......................... 375/148 |
| 2004/0105418 A1 * | 6/2004 | Hirade ....................... 370/342 |

FOREIGN PATENT DOCUMENTS

| | | |
|---|---|---|
| EP | 1 148 657 A2 | 10/2001 |
| EP | 1 209 818 A1 | 5/2002 |
| EP | 1 286 475 A2 | 2/2003 |
| WO | WO 00/21201 | 4/2000 |
| WO | WO 00/35112 | 6/2000 |
| WO | WO 02/29994 A2 | 4/2002 |

OTHER PUBLICATIONS

International Search Report prepared by the European Patent Office as completed Nov. 19, 2003. (7 pages).

* cited by examiner

*Primary Examiner*—Chieh M. Fan
*Assistant Examiner*—Freshteh N Aghdam
(74) *Attorney, Agent, or Firm*—Michael Cameron, Esq.

(57) ABSTRACT

Method and system are disclosed for providing advanced RAKE delay control in wireless communications systems. The RAKE delay control method and system of the invention is capable of tracking presently known paths over time and merging the tracking results with new path searcher results. The invention is particularly suitable for devices where the resources (e.g., computational load, power) available for detecting the multipath components are limited. The result is a resource efficient architecture for positioning the RAKE fingers to best extract the signal power available in the channel and to utilize the inherent diversity due to the multipath nature of the signal.

24 Claims, 4 Drawing Sheets

ADVANCED RAKE DELAY CONTROL

CROSS-REFERENCE TO RELATED APPLICATION

This application for patent claims the benefit of priority from, and hereby incorporates by reference, U.S. Provisional Patent Application Ser. No. 60/412,152, entitled "Advanced RAKE Delay Control," filed with the U.S. Patent and Trademark Office on Sep. 18, 2002.

BACKGROUND OF THE INVENTION

1. Field of the Invention

The invention relates to wireless communication systems and, in particular, to an advanced method and system for providing RAKE delay control.

2. Description of the Related Art

In wireless communication, the physical channel between a transmitter and a receiver is formed by a radio link. In most cases, the transmitter is not narrowly focused towards the receiver and, in addition to a possible direct path, many other propagation paths exist between the parties due to objects in the surroundings. Referring to FIG. 1, for example, a receiver 100 may receive a radio signal from a transmitter 102 on a direct and unobstructed path (Path 1). However, many other propagation paths (e.g., Path 2, Path 3) may exist. Thus, multiple instances of the same transmission may be received by the receiver 100 as portions of the radio signal are reflected by various objects and obstacles (e.g., a house 104, a building 106) in the surroundings.

These multipath signals will arrive at the receiver 100 delayed by different amounts of time after the direct signal and will usually have different magnitudes than the direct signal. Multipath signals with similar propagation distances may then be combined, depending on the time resolution of the transmission system and the instantaneous phase relationship of the multipath signals, to form a distinct multipath component. The effect of combining depends on the instantaneous relationship of the carrier wavelength and distance differences and, in the case of destructive interference, can lead to significant decrease of the magnitude, or fading, of the path gain.

In CDMA (Code Division Multiple Access) based systems, a RAKE receiver is used to identify and track the various multipath components for a given channel. The RAKE receiver includes a plurality of despreaders or RAKE fingers, each of which is assigned a multipath component. The despreaders each have a copy of the CDMA spreading code that is delayed by an amount of time equal to the path delay of the corresponding multipath component. The outputs of the despreaders are then coherently combined to produce a symbol estimate.

In order to be effective, the RAKE receiver requires knowledge of the multipath delays and the values of the channel impulse response for every path. The reason is because paths that are not detected can still act as sources of interference to the other fingers in the RAKE, even though the signal energy they carry is not usefully utilized. In addition, the smaller the number of paths available at the receiver (utilized diversity), the larger the probability they may undergo simultaneous deep fade, leading to serious degradation of the block error rate (BLER).

Techniques for identifying a multipath signal are described, for example, in U.S. patent application Ser. Nos. 09/678,165, 10/246,873 and 10/246,874, which are hereby incorporated by reference herein. One way to identify a multipath signal and determine its delay is to search for possible paths over a range of possible delays. This path searching can be performed by transmitting a pilot signal from the transmitter and applying a series of predefined delays for despreading at the receiver. Where the predefined delays happen to coincide with the arrival times of the multipath signals, a larger-magnitude channel estimate will result. The resulting delay profile, which can be a complex delay profile (CDP) or a power delay profile (PDP), may then be subjected to peak detection, and the location of the peaks are reported to the RAKE receiver as estimates of the multipath delays of the channel.

FIG. 2 illustrates an exemplary PDP of a given channel for one pass or iteration of the path search. The vertical axis in FIG. 2 represents the magnitude of the detected signal, while the horizontal axis represents the size of the delays applied. The PDP of FIG. 2 shows all the signals that are received by the receiver, including noise and interference signals. Only the peaks in the PDP correspond to the multipath signals of the channel. The peaks together form the impulse response of the channel.

However, the processing and power consumption expense of frequently executing this path searching routine is prohibitive in many cases. Therefore, it is necessary to introduce compromises that make the solution feasible. Thus, a practical implementation may use reduced searcher resolution, and may introduce additional, short-range despreader groups to produce higher-resolution estimates of certain areas of the PDP. An example of this type of architecture can be seen in published PCT application WO0035112 and in FIG. 3.

Referring to FIG. 3, an exemplary implementation of a RAKE delay controller (RDC) 300 includes the use of a path searcher 302, a path tuning stage 304, and a controller 306, all interconnected as shown. The path searcher 302 is a device that computes instantaneous channel impulse response estimates (complex or power) over a range of delays that constitutes a significant fraction of the maximum delay spread allowed by the system. The CDP or PDP for a given delay value is estimated by correlating the received data for the pilot symbols with an appropriately delayed copy of the spreading sequence, a method which is well known in the art. Often, the path searcher 302 is used mainly as a means to detect the existence of paths and, therefore, its output resolution may be somewhat lower than the resolution required by the RAKE receiver.

The path tuning stage 304 produces a high-resolution instantaneous CDP or PDP over a narrow delay window. The path tuning stage 304 has tuning fingers that may include a number of despreaders that are similar to the despreaders of the RAKE fingers of the path searcher except they are usually more closely spaced together. Because of the higher resolution, the path tuning stage 304 is commonly used to locally refine the coarser PDP information provided by the path searchers 302.

The controller 306 extracts the physical path location information from the path searcher 302 and the path tuning stage 304 output. This location information is then presented as delay estimates to subsequent receiver stages, and assignment of distinct paths to the RAKE fingers is made. The degree of complexity of the controller may vary significantly depending on system parameters, and may range from simple peak detection to sophisticated de-convolution and filtering algorithms.

The nature of the RDC 300 shown in FIG. 3 is that it is an inherently sequential structure insofar as only the most recently produced path searcher results are used when computing the refined delay estimates. Also, when new path searcher output estimates become available, the locations used for fine-tuning by the tuning fingers are reassigned according to the new estimates. Thus, the fine-tuning process does not explicitly follow or account for the existing path positions. That is, inclusion of a path in RAKE processing depends only on the path's fading state. Due to the fading of the individual paths and varying levels of interference, some multipath components may escape detection altogether, thereby degrading both the instantaneous signal-to-interference ratio (SIR) and the utilized diversity in the fading environment.

Accordingly, it would be desirable to provide a RAKE delay control architecture that is capable of tracking the presently known paths over time and merging the tracking results with the new path searcher results. Once the paths are assigned, it would be desirable for the assignments to remain constant over a significant time to allow reliable power and interference estimation. It is further desirable that such a RAKE delay control architecture can be used in devices where the resources (e.g., computational load, power) are limited. Additional support functions, such as the ability to determine the path searcher search area and activation times, and placement of the tuning fingers, are also desirable.

SUMMARY OF THE INVENTION

The invention relates to an advanced method and system for providing RAKE delay control in wireless communications systems. The RAKE delay control method and system of the invention is capable of tracking presently known paths over time and merging the tracking results with new path searcher results. The invention is particularly suitable for devices where the resources (e.g., computational load, power) available for detecting the multipath components are limited. The result is a resource efficient architecture for positioning the RAKE fingers to best extract the signal power available in the channel and to utilize the inherent diversity due to the multipath nature of the signal.

In general, in one aspect, the invention is directed to a system of controlling multipath delays in a RAKE receiver. The system comprises a path searcher configured to search a radio channel for multipath component positions and to provide a low resolution estimate of the multipath component positions. The system further comprises a path tuning stage configured to search the channel for multipath components based on the low resolution estimate of multipath component positions and to provide a high resolution estimate of the multipath component positions. A path tracking stage is configured to track existing multipath component positions provided by the tuning fingers in a manner such that the existing multipath component positions are known even after they have changed. A path selection stage is configured to merge the existing multipath component positions with new multipath component positions provided by the path tuning stage, including selecting one or more multipath components from the existing multipath component positions and the new multipath component positions based on at least one predetermined criteria.

In general, in another aspect, the invention is directed to a method of controlling multipath delays in a RAKE receiver. The method comprises the steps of searching a radio channel for multipath component positions to provide a low resolution estimate of the multipath component positions, and searching the channel for multipath components based on the low resolution estimate of multipath component positions to provide a high resolution estimate of the multipath component positions. The method further comprises tracking existing multipath component positions based on information provided by the high resolution estimate in a manner such that the existing multipath component positions are known even after they have changed, and combining the existing multipath component positions with new multipath component positions provided by the high resolution estimate, including selecting one or more multipath components from the existing multipath component positions and the new multipath component positions based on at least one predetermined criteria.

It should be emphasized that the term comprises/comprising, when used in this specification, is taken to specify the presence of stated features, integers, steps, or components, but does not preclude the presence or addition of one or more other features, integers, steps, components, or groups thereof.

BRIEF DESCRIPTION OF THE DRAWINGS

A more detailed understanding of the method and system of the present invention may be had by reference to the following detailed description when taken in conjunction with the drawings, wherein.

DETAILED DESCRIPTION OF THE INVENTION

Figure 1:
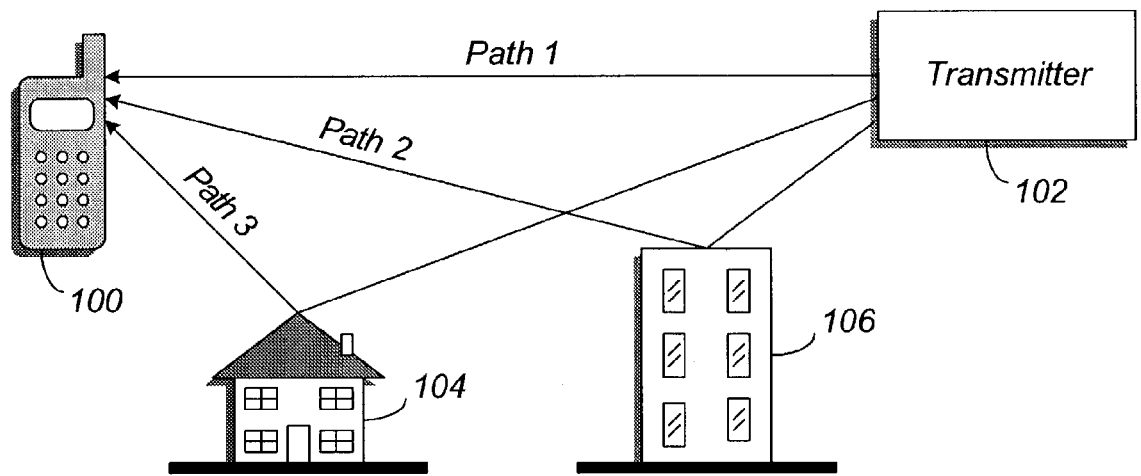
FIG. 1 illustrates various exemplary multipath propagation paths.

Following is a detailed description of the invention wherein reference numerals for the same or similar elements are carried forward. For economy of the description, the invention will be described with respect to a power delay profile (PDP). It should be noted, however, that the invention is equally applicable to both PDP and complex delay profiles (CDP).

Embodiments of the invention provide a RAKE delay control architecture that combines coarse and fine resolution PDP evaluation. The RAKE delay control architecture of the invention performs tracking of known paths and flexibly combines various types of information to maintain the multipath positions with high precision over time. New multipath positions are then added into the processing as they are detected.

Figure 4:
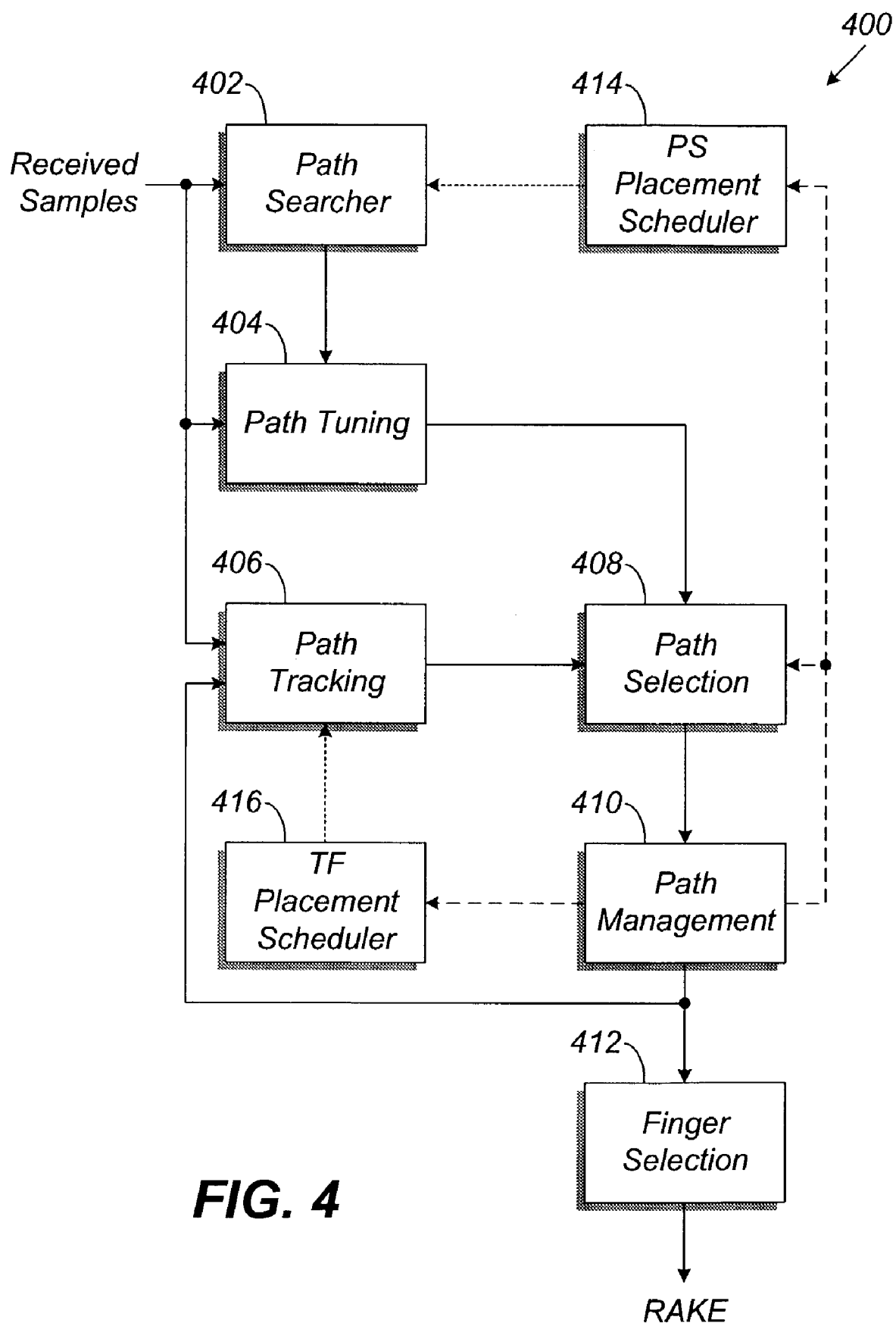
FIG. 4 illustrates a multipath delay estimation system according to embodiments of the invention.

Referring now to FIG. 4, a RAKE delay control 400 according to embodiments of the invention is shown. The RDC 400 of the invention includes a path searcher 402, a path tuning stage 404, a path tracking stage 406, a path selection stage 408, a path management stage 410, and a RAKE finger selection stage 412. Also included are a path searcher placement and scheduler function 414 and a tuning finger placement and scheduler function 416. Note in FIG. 4 that the solid lines indicate data or information signals and the dotted lines indicate control signals (which may also include data or information). In some embodiments, the above stages and functions are implemented in a device with limited processing resources, such as a mobile radio terminal (not expressly shown). Each of these stages and functions will be described below.

Figure 2:
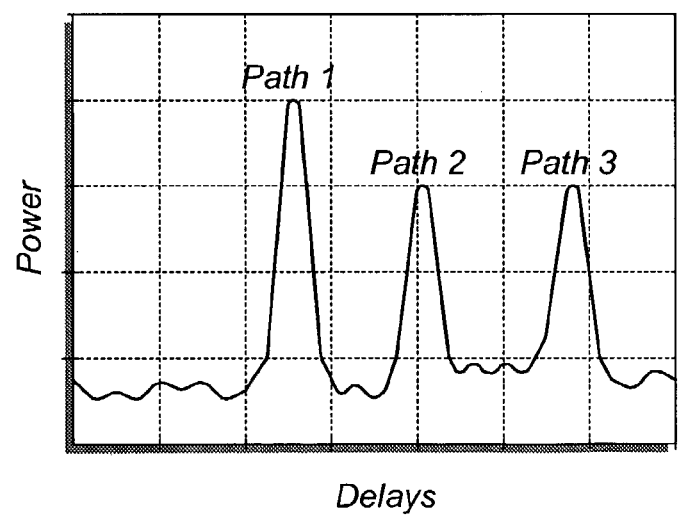
FIG. 2 illustrates an exemplary power delay profile and channel impulse response for a given channel.
Figure 3:
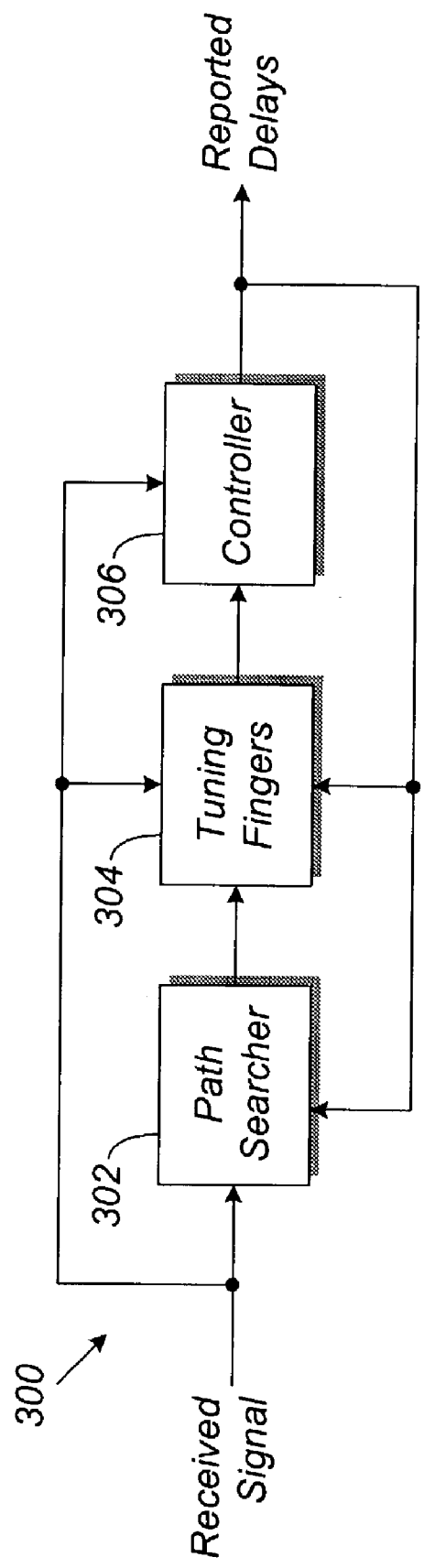
FIG. 3 illustrates an exemplary multipath delay estimation system.

The path searcher 402 and the path tuning stage 404 are the same as or similar to existing path searchers and tuning stages, such as the ones shown in FIG. 3. The function of the path searcher 402 is to provide low-resolution detection of multipath components in the channel over the allowed delay range based on received samples of the radio signals. In some embodiments, the output of the path searcher 402 is a CPD or PDP of the channel, with the path positions indicated by the peaks (see FIG. 2). The function of the path tuning stage 404 is similar to that of the path searcher except that the resolution of the path tuning stage 404 is higher (e.g., two times) and the delay range is much narrower. The path tuning stage 404 thereafter outputs one or more refined path positions.

The path tracking stage 406 tracks the positions of currently known paths by updating the path positions as needed (based on the received samples and on the information provided by the path management stage 410). This allows the position of the path to be identified even when the path has moved and no new path searcher information is yet available. In some embodiments, the path tracking stage 406 performs the tracking/updating by positioning a tuning finger around each multipath component being tracked. The tuning fingers of the path tracking stage 406 are positioned using information regarding the currently tracked paths obtained from the path management stage 410. Note that the path tracking stage 406 and the path tuning stage 404 use similar tuning finger hardware for their respective operations, except that the tuning fingers of the path tracking stage 406 are activated more frequently.

The path selection stage 408 receives the refined path estimates from the path tuning stage 404 and path tracking stage 406 and combines or merges the result by jointly selecting the best candidates from both stages. That is, the path tracking stage 406 provides the latest positions of the currently known paths, while the path tuning stage 404 may include positions of additional paths that were recently discovered by the path searcher 402. In some embodiments, the path selection stage 408 may also use information based on the list of currently known paths (e.g., from the path management stage 410). In some embodiments, the selection criterion used by the path selection stage 408 may be based on the signal power of a candidate during the last tuning finger evaluation. In some embodiments, all known paths are removed from the list provided by the path tuning stage 404, and the remaining paths are merged with the paths from the list provided by the path tracking stage 406. Then, the paths from the merged list that have a signal power above a certain level are selected. In some embodiments, the path selection stage 408 may also receive information from the path management stage 410 In some embodiments, merging may take into account the relative distances between the new and old positions and thereby require that a minimum spacing be maintained between the delay estimate assignments.

The path management stage 410 receives the selections from the path selection stage 408 and compares them to previous selections. In particular, the path management stage 410 makes a determination as to whether a path has moved since the last evaluation. This determination may be based on comparisons of recent positions of the path (e.g., the previous x positions). If movement is detected, filtering of the PDP or CDP associated with the path may be performed using the instantaneous delay locations reported by the tuning fingers. The filtering may be a low-pass linear or non-linear average of the signal power for a particular path, or it could be an average of a path's signal power over time. The averaged value may then be used to maintain a path position across fading (fading-independent). Filtering may also include comparing a currently found path position to the previous position(s) and deciding whether the path position has moved (i.e., a variant of median filtering). The filtered path delay positions are then additionally processed as control information about the current paths for use in the next path tracking cycle. The path management stage 410 also maintains the identity of the individual paths, so that a given delay value is associated with the same path. To accomplish this, the path management stage 410 may maintain filtered values of the CDP or PDP estimates at the locations of interest to avoid losing track of a path during a deep fade. In this way, the association between a particular delay value and the respective multi-path component being tracked can be maintained, even after the multipath component has moved.

The finger selection stage 412 receives the delays that are finally selected by the previous stages and additionally processes them to detect those delay values that may not correspond to a physical path, but are instead reported due to noise and interference in the receiver. In some embodiments, the finger selection stage 412 may be configured to use thresholding to select the delays. That is, the finger selection stage 412 may be configured to select only those delay values having a CDP or PDP above a certain threshold value, and reject any that are below the threshold value. Other methods may also be used without departing from the scope of the invention.

The path delay values that are selected by the finger selection stage 412 are then reported to the RAKE receiver. The RAKE receiver then uses this information to combine the multipath components being tracked by the selected fingers. Note that the association between a particular delay value reported to the RAKE receiver and the respective multi-path component being tracked can be maintained (as explained above), even after the multipath component has moved.

The path searcher placement and scheduler function 414 controls (dotted line) the path searcher activation times. This can be done, for example, by detecting degradation in the SIR of the RAKE output, detecting changes in the channel structure, or by enforcing a fixed schedule whose frequency may depend on the environment (e.g., the "Doppler spread" estimate). Other activation methods may also be used, such as the one disclosed in U.S. patent application Ser. No. 10/246,874, which is hereby incorporated by reference. The path searcher placement and scheduler function 414 also controls the width and placement of the search window (i.e., evaluated delay range) by using the information about the existing paths. This information about the existing paths may be based on the results of previous path searcher run, or it may be based on the list of currently known paths (e.g., from the path management stage 410). Control of the window position is done, in some embodiments, by computing the center of gravity of the paths based on the PDP of the currently tracked paths. In some embodiments, the path searcher window size may also be adjusted by the path searcher placement and scheduler function 414 based on the actual channel delay spread (which is determined by the propagation paths in the physical environment).

The tuning finger placement and scheduler function 416 controls (dotted line) the activation times and positioning and manages the assignment of the path tracking stage's tuning fingers to individual path locations. In some embodiments, the path selection stage 408 uses information based on the list of currently known paths (e.g., from the path management stage 410) to control the activation times and positioning. A typical tuning finger assignment involves centering the tuning finger around a known path, and activating the tuning finger according to a fixed schedule. In some embodiments, there may be fewer physical tuning finger setups than the number of paths to be tracked or path searcher peaks to be tuned. In that case, time-multiplexing of the tuning fingers may be implemented.

Figure 5:
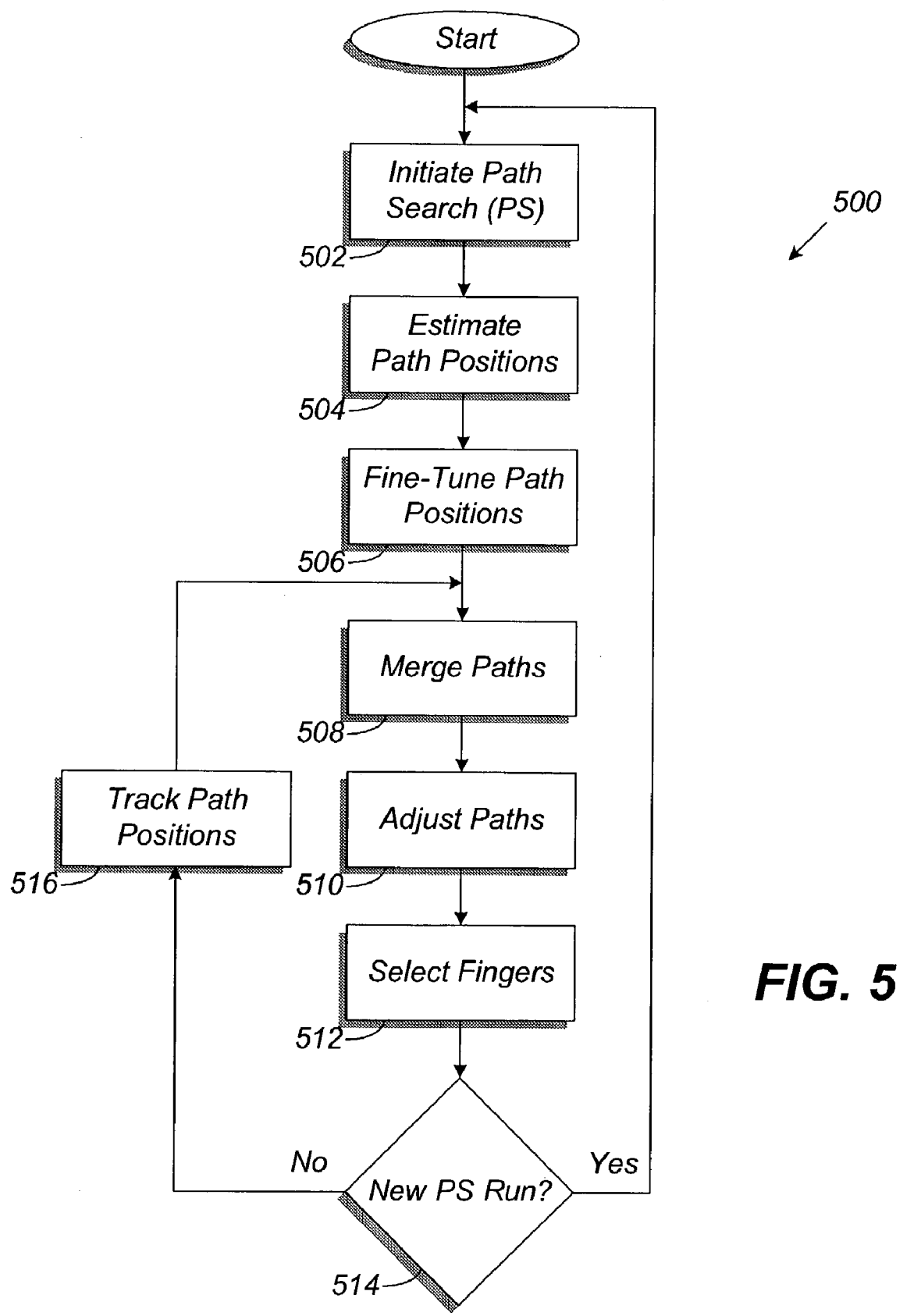
FIG. 5 illustrates a multipath delay estimation method according to embodiments of invention.

Referring now to FIG. 5, a method 500 that can be used in conjunction with the advanced RAKE delay control 400 of the present invention is shown. The method begins at step 502 where a search of the channel for multipath components is initiated using, for example, a path searcher. At step 504, path positions are estimated based on the results of the path search based on, for example, the CDP or PDP generated by the path searcher. At step 506, the estimated path positions are fine-tuned using, for example, the tuning fingers described above. At step 508, the path positions are merged by selecting the best path candidates from the fine-tuning step (step 506) and the path tracking step (step 516, described later herein). At step 510, adjustments are made to the path positions as needed, for example, by filtering the path positions if movement of the paths has been detected. At step 512, selection of the RAKE fingers that are to be used in combining the multipath components is made based on the estimated paths. Selection of the RAKE fingers may be based on whether a path is determined, for example, to be above a threshold PDP or CDP value. At step 514, a determination is made as to whether a new path search is to be run depending on, for example, the fixed or event-driven scheduling of the path searcher. If the answer to step 514 is yes (less frequently), then the method 500 returns to the path searching step at step 502. On the other hand, if the answer is no (more frequently), then the method 500 proceeds to step 516, where the positions of the various paths are tracked. This allows the positions of the paths to be identified even after they have moved. The paths that are tracked by the path tracking step 516 are then provided as candidates to the path merging step 508 to be merged with the candidates from the fine-tuning step 506.

The foregoing embodiments of the invention provide a number of advantages over existing solutions. For example, the known path positions are tracked over time, thus maintaining them even when they move and no new path searcher information is available. In addition, new paths discovered by the path searcher are included in the RAKE delay set without unnecessarily dismissing the old paths. Furthermore, the delay values reported to the RAKE maintain their association with particular multipath components over extended time, enabling long-term averaging for channel and interference estimation. Also, filtering/averaging of the delays introduces "memory" for maintaining the knowledge of the known paths even when they have faded. Finally, the invention improves the performance of the RAKE receiver without requiring significantly more resources, such as would be needed for more frequent path searcher or tuning finger runs.

While a limited number of embodiments have been disclosed herein, those of ordinary skill in the art will recognize that variations and modifications from the described embodiments may be derived without departing from the scope of the invention. For example, while the invention has been described with respect to a number of discrete stages, functions, and steps, two or more of these stages, functions, and steps may be combined into one stage, function, and step, or one or more of these stages, functions, and steps may be divided into several smaller stages, functions, and steps. Accordingly, the appended claims are intended to cover all such variations and modifications as falling within the scope of the invention.

What is claimed is:

1. A system for controlling finger delays in a RAKE receiver, comprising:
    a path searcher configured to search a radio channel for multipath component positions and to generate a low resolution estimate of the multipath component positions;
    a path tuning stage configured to search the channel based on the low resolution estimate of multipath component positions and to generate a new high resolution estimate of the multipath component positions;
    a path tracking stage configured to track existing multipath component positions generated by the path tuning stage in a manner such that the existing multipath component positions are known even after they have changed; and
    a path selection stage configured to merge the tracked existing multipath component positions provided by the path tracking stage with new multipath component positions generated by the path tuning stage, including selecting one or more multipath components from the existing multipath component positions and the new multipath component positions based on at least one predetermined criteria.

2. The system according to claim 1, wherein the path selection stage is further configured to maintain a minimum spacing between the selected one or more multipath components.

3. The system according to claim 1, further comprising a path management stage configured to determine whether a multipath component has moved based on differences between the existing multipath component positions and the new multipath component positions, and to filter information associated with the multipath component if it is determined that the multipath component has moved.

4. The system according to claim 3, wherein the path management stage is further configured to maintain an association between a multipath component position and a selected multipath component even after the multipath component has moved.

5. The system according to claim 1, further comprising a finger selection stage configured to select one or more fingers of the RAKE receiver that are assigned to track the selected one or more multipath components.

6. The system according to claim 5, wherein the finger selection stage selects a finger of the RAKE receiver if a corresponding multipath component has a complex delay profile or a power delay profile that is above a predefined threshold value.

7. The system according to claim 1, further comprising a path searcher placement and scheduler function configured to control one or more parameters associated with the search performed by the path searcher, including search activation time, search window size, and search window position.

8. The system according to claim 1, further comprising a tuning fingers placement and scheduler function configured to control one or more parameters associated with the tuning fingers of the path tracking stage, including activation time, search window position, and tuning finger assignments.

9. The system according to claim 1, wherein the RAKE receiver is implemented in a mobile radio terminal.

10. A method of controlling finger delays in a RAKE receiver, comprising:

searching a radio channel for multipath component positions to generate a low resolution estimate of the multipath component positions;

searching the channel for multipath components based on the low resolution estimate of multipath component positions to generate a new high resolution estimate of the multipath component positions;

tracking existing multipath component positions based on information generated by the high resolution estimate in a manner such that the existing multipath component positions are known even after they have changed; and combining the tracked existing multipath component positions with new multipath component positions generated by the high resolution estimate, including selecting one or more multipath components from the existing multipath component positions and the new multipath component positions based on at least one predetermined criteria.

11. The method according to claim 10, further comprising maintaining a minimum spacing between the selected one or more multipath components.

12. The method according to claim 10, further comprising determining whether a multipath component has moved based on differences between the existing multipath component positions and the new multipath component positions, and filtering information associated with the multipath component if it is determined that the multipath component has moved.

13. The method according to claim 12, further comprising maintaining an association between a multipath component position and a selected multipath component even after the multipath component has moved.

14. The method according to claim 10, further comprising selecting one or more fingers of the RAKE receiver assigned to track the selected one or more multipath components.

15. The method according to claim 14, wherein the step of selecting one or more fingers of the RAKE receiver includes selecting a finger if a corresponding multipath component has a complex delay profile or a power delay profile that is above a predefined threshold value.

16. The method according to claim 10, further comprising controlling one or more parameters associated with the low resolution estimate search, including search activation time, search window size, and search window position.

17. The method according to claim 10, further comprising controlling one or more parameters associated with the tracking of existing multipath component positions, including tuning finger assignment.

18. The method according to claim 10, wherein the RAKE receiver is implemented in a mobile radio terminal.

19. A system for controlling finger delays in a RAKE receiver implemented in a mobile radio terminal and having a path searcher configured to search a radio channel for multipath component positions and to generate a low resolution estimate of the multipath component positions, and a path tuning stage configured to search the channel for multipath components based on the low resolution estimate of multipath component positions and to generate a new high resolution estimate of the multipath component positions, the improvements comprising:

a path tracking stage configured to track existing multipath component positions generated by the path tuning stage in a manner such that the existing multipath component positions are known even after they have changed;

a path selection stage configured to merge the existing multipath component positions with new multipath component positions generated by the path tuning stage, including selecting one or more multipath components from the existing multipath component positions and the new multipath component positions based on at least one predetermined criteria;

a path management stage configured to determine whether a multipath component has moved based on differences between the existing multipath component positions and the new multipath component positions, and to filter information associated with the multipath component if it is determined that the multipath component has moved; and a finger selection stage configured to select one or more fingers of the RAKE receiver assigned to track the selected one or more multipath components.

20. The improvements according to claim 19, wherein the path management stage is further configured to maintain an association between a multipath component position and a selected multipath component even after the multipath component has moved.

21. The improvements according to claim 19, wherein the path selection stage is further configured to maintain a minimum spacing between the selected one or more multipath components.

22. The improvements according to claim 19, wherein the finger selection stage selects a finger of the RAKE receiver if a corresponding multipath component has a complex delay profile or a power delay profile that is above a predefined threshold value.

23. The improvements according to claim 19, further comprising a path searcher placement and scheduler function configured to control one or more parameters associated with the search performed by the path searcher, including search activation time, search window size, and search window position.

24. The improvements according to claim 19, further comprising a tuning fingers placement and scheduler function configured to control one or more parameters associated with the search performed by the tuning fingers, including search activation time, search window position, and tuning finger assignments.

* * * * *